J. H. MORIN.
STOCK REGISTER.
APPLICATION FILED APR. 19, 1919.

1,360,432.

Patented Nov. 30, 1920.
3 SHEETS—SHEET 1.

WITNESSES:

INVENTOR.
J. H. Morin
BY
ATTORNEYS

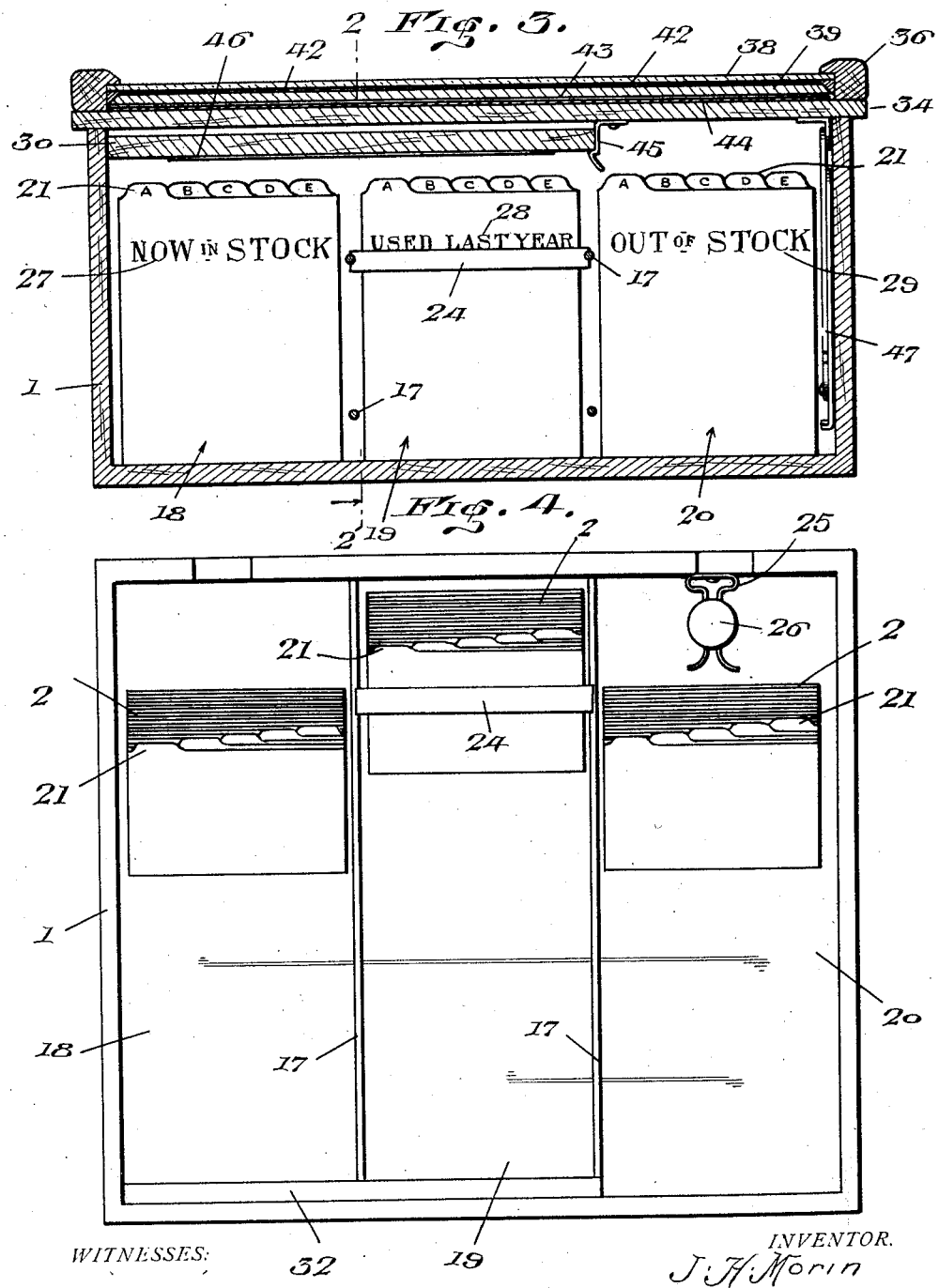

J. H. MORIN.
STOCK REGISTER.
APPLICATION FILED APR. 19, 1919.

1,360,432.

Patented Nov. 30, 1920.
3 SHEETS—SHEET 3.

Fig. 5.

| NO PCS. | LOT NUMBER 770 | | | | |
|---|---|---|---|---|---|
| 1000 | | | | | |
| | PRODUCT | DATE | No Used | D | M |
| | Sugar | 4/5/19 | 60 | | |
| | BRAND Granulated | | | | |
| CONTENTS PER | 5 | | | | |
| SIZE | DATE  19 | | | | |
| Bought From | | | | | |
| F.O.B | | | | | |
| INVOICE TOTAL | | | | | |
| COST PRICE | | | | | |
| MARKET PRICE | | | | | |
| RETAIL PRICE | | | | | |
| DISC % | PERC. OF PROFIT | | | | |
| STOCK Location | | | | | |
| | (OVER) | | | | |

Fig. 6.

MEMORANDUM

FUTURE ORDER

DATE              19

Bought From

F.O.B

DISCOUNT     %

| PRODUCT | | BRAND | |
|---|---|---|---|
| AMOUNT BOUGHT | | AMOUNT RECD. | |
| CONTENTS PER | | SIZE | |
| DATE EXPECTED  19 | | COST PER | |

Fig. 7.

CLERK'S DAILY REMINDER

WORKING ORDER

DATE          NAME

WITNESSES:

Fig. 8.

| No CASES | D | M | Let. | LOT NO. |
|---|---|---|---|---|
| 60 | | | A | 770 |
| 70 | | | B | 316 |
| | | | | |
| | | | | |
| | | | | |
| | | | | |

DATE  4/5/19

SIGNED

INVENTOR.
J. H. Morin
BY
ATTORNEYS

UNITED STATES PATENT OFFICE.

JOSEPH H. MORIN, OF NASHUA, NEW HAMPSHIRE.

STOCK-REGISTER.

1,360,432.　　　　Specification of Letters Patent.　　Patented Nov. 30, 1920.

Application filed April 19, 1919. Serial No. 291,371.

*To all whom it may concern:*

Be it known that I, JOSEPH H. MORIN, a citizen of the United States, residing at Nashua, in the county of Hillsborough and State of New Hampshire, have invented certain new and useful Improvements in Stock-Registers; and I do hereby declare the following to be a full, clear, and exact description of the invention, such as will enable others skilled in the art to which it appertains to make and use the same.

The present invention relates to a stock register, and it is the primary object of the invention to provide a register for keeping at the finger tips, a correct and complete record of the stock goods used and on hand, combined with reference data as to where the goods were bought, the price thereof, how the transactions were made, etc.

A further object of the invention is the provision of a stock register for use in stores, wholesale houses, supply departments of factories, and the like, embodying cards for keeping a record of the stock goods used and on hand, together with reference data, and means for holding the cards for convenient reference thereto or entries as the goods are sold, in order that the buyer of the stock will have a complete record at hand, so that he may in a moment observe the amount of stock on hand, the condition in which it is being taken, the period of time in selling, the lot number of the goods being sold, and other handy information for present and future reference.

Another object is the provision of such a register embodying a novel cabinet for holding the cards, with charts to facilitate reference to the cards for making entries thereon or examining the cards, said cabinet being especially constructed for use as a stock register in connection with the cards, in order that the register will be incased or housed in small space for convenient access and reference to the cards.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Fig. 3 is a vertical section taken on the line 3—3 of Fig. 2.

Fig. 4 is a plan view of the cabinet with the top removed.

Fig. 5 is a front view of the record card.

Fig. 6 is a rear view of said card.

Fig. 7 is a front view of the working order slip.

Fig. 8 is a plan view of the stock clerk's requisition slip.

Figure 1:
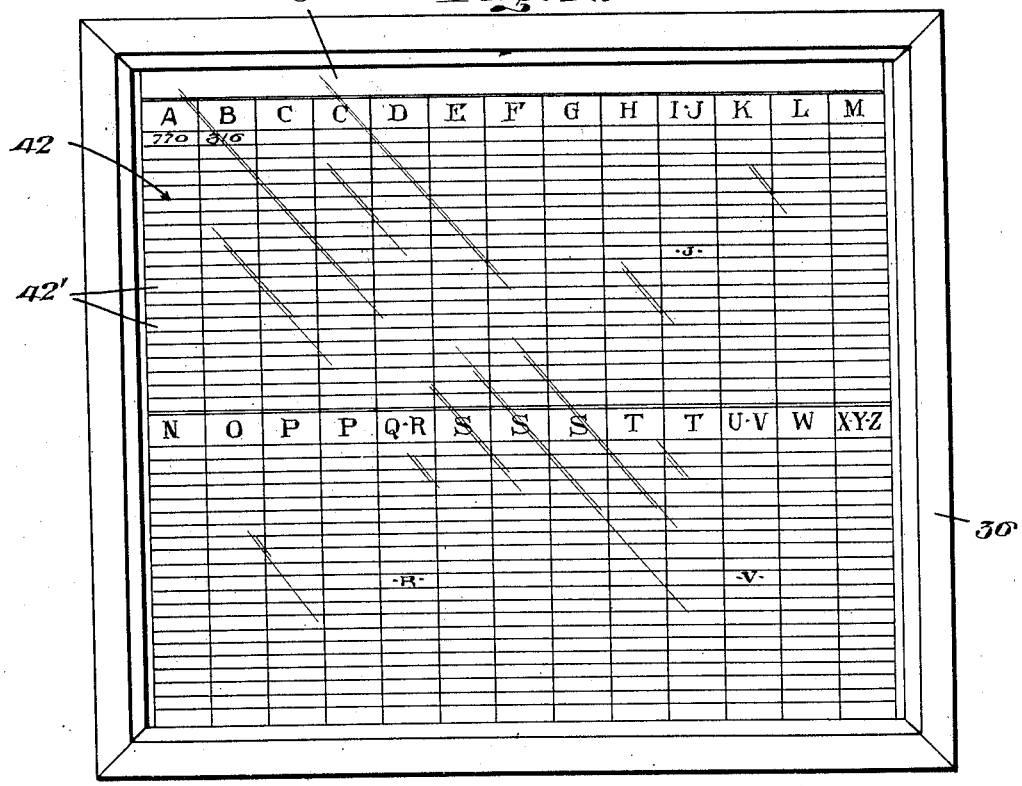
Figure 1 is a plan view of the cabinet showing the number chart.

The stock register includes a cabinet or casing 1 of suitable size for housing or holding the record cards 2, the opposite sides of which are printed or otherwise provided with the blank spaces and legends, as seen in Figs. 5 and 6. On its front space, the card 2 is provided with a space 3 with the legend "Lot number" in which is printed or written the lot number of the particular goods or stock, and the front side of the card is also provided with the vertical columns 4, 5, 6, and 7 divided up into spaces or squares to receive inscriptions. The column 4 is to record the dates of the transactions, the column 5 the number of packages, boxes or articles used or sold, the column 6 the number of packages or boxes damaged, and the column 7 the number of packages or boxes missing. The columns 6 and 7 have the letters "D" and "M" at their upper ends, respectively, to indicate damaged goods and missing goods. The face of the card also has other spaces for the name of the product, brand, contents, where and from whom the lot of goods were bought, prices, discount, etc., thereby giving a complete record, and the notations in the columns 4, 5, 6 and 7 indicate what disposition has been made of the goods, and will indicate the amount of stock on hand by making deductions for the goods disposed of. The card 2 is provided on the back with a space for memorandum, and data as to future order, as seen in Fig. 6.

In Fig. 8 is illustrated the stock clerk's requisition slip or sheet 8, which is provided with the vertical columns of spaces 9, 10, 11, 12 and 13 for the lot number, number of cases or packages disposed of, damaged goods, missing goods, and letter or initial, respectively. These slips 8 are preferably provided in packs or pads and the stock clerk makes notations of his transactions on these goods, from which the data is transferred or posted on the respective cards 2 having the proper lot numbers. The slips 8 are thus used for making a temporary record of the transactions during the day, and from these slips the data is transferred to and recorded on the cards 2 which will contain a complete record of the successive transactions. The slip 8 also has the space 14 for the date, and a space 15 for the signature of the clerk. The initial letter in column 13 and lot number in column 9 are to facilitate the entries on the proper cards 2, the data from the space 14 being noted the column 4 of the card 2, and the numerals from columns 10, 11 and 12 being transferred to the columns 5, 6 and 7 of the card 2, which will therefore contain a complete record of what disposition has been made of the stock.

A "working order" slip or sheet 16 is preferably used in connection with the slips 8, to contain information or data for use by the stock clerk. These slips 16 are also preferably provided in pads to be used or torn off, the same as the slips 8.

Figure 2:
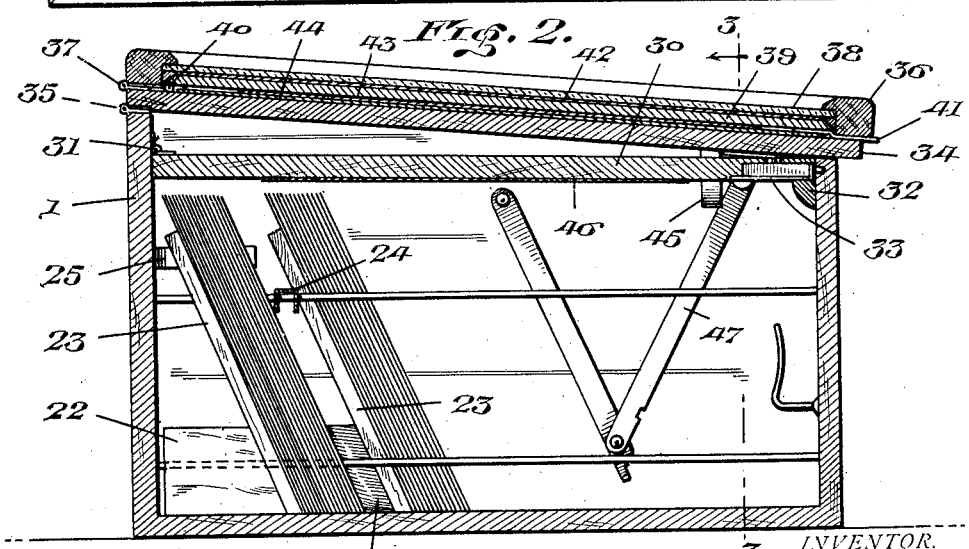
Fig. 2 is a vertical section taken on the line 2—2 of Fig. 3.

Returning to the description of the cabinet 1, the same is provided with three compartments or chambers for the cards 2. Thus, vertically spaced rods 17, of which there are two pairs, extend forwardly and rearwardly with their ends secured to the front and rear walls of the cabinet, and these rods divide the interior of the cabinet into the three compartments 18, 19 and 20 extending forwardly and rearwardly side by side to hold three packs of the cards 2, the compartment 18 being for the cards of goods now in stock, the compartment 19 for cards of goods used the previous year, and the compartment 20 for cards representing goods out of stock. Each compartment is provided with index cards bearing the letters of the alphabet, in order that the cards 2 can be filed away in the respective compartments under the initial letters representing the various products or goods, such initial letters being preferably the first letters of the names or natures of the various products or goods, such as "A" for apples, "S" for sugar and so on. In order to conveniently support the cards in the compartments, a follower block 22 is disposed in each compartment and is seated slidably on the bottom of the cabinet, and each block supports an inclined back 23 for the cards against which the cards rest, as seen in Fig. 2. A cross piece 24 is provided in the compartment 19 and has notched ends engaging the upper rods 17 so as to slide forwardly and rearwardly, and this cross piece can be slid rearwardly to hold the cards in the compartment 19 back against the respective follower. A holder 25 for a rubber stamp 26 or other implement used with the register, is shown as being carried by the back wall of the cabinet at the rear end of the compartment 20. The foremost cards in the compartments 18, 19 and 20 are preferably provided with the legends "Now in stock," "Used last year" and "Out of stock," so that the cards can be filed away according to whether they represent goods now in stock, goods used the previous year, or goods out of stock.

In order to prevent unauthorized access to the cards in compartments 18 and 19, and to permit the cards in compartment 20 to be readily inspected without requiring the use of a proper key, a door or cover 30 for compartments 18 and 19 is provided, said door being located within the cabinet above said compartments and being hinged, as at 31, to the back wall of the cabinet to swing upwardly when released. This door 30 has a lock 33 at its forward end to engage the front wall of the cabinet and prevent said door from being raised unless unlocked by the use of a required key, the front wall of the cabinet having a cleat 32 providing a seat for supporting the forward end of the door when locked. Thus, when the door 30 is locked, the cards in compartments 18 and 19 cannot be removed or inspected, while the cards in the compartment 20 can be readily removed and inserted without opening the door 30.

A top 34 is provided for the cabinet, the same being hinged at its rear edge, as at 35, to the upper edge of the back wall of the cabinet, so as to swing open outwardly and rearwardly. This top 34 ordinarily closes the cabinet and conceals the cards therein, and it is preferable to have the top 34 inclined as seen in Fig. 2. Seated on the top 34 of the cabinet is a frame 36 hinged at its rear edge, as at 37, to the rear edge portion of the top 34 to swing upwardly and rearwardly off of the top 34, and this frame 36 has a glass or other transparent panel 38 below which a board or plate 39 is fitted within the frame 36. Said board or plate 39 is hinged at its rear edge, as at 40, to the rear portion of the frame, whereby said frame and plate can be swung apart, The plate 39 has a finger piece 41 secured thereto and projecting from its forward edge below the forward portion of the frame 36 so that the plate 39 can be swung either with the frame 36 or away from said frame when the frame is swung upwardly. Disposed on the plate or board 39 underneath the transparent panel 38 is a number card 42 provided with the columns of spaces 42' under the letters of the alphabet, to receive the lot numbers under their respective initial letters. The lot numbers are thus written or printed in the spaces on the card under the respective initial letters, and this will provide a chart or table of the lot numbers in order that the clerk will have before him the chart of the lot numbers and initial letters to correspond, for convenience in locating the cards and filing them away. This will also give a record of the lot numbers in use. A similar chart 44 is also provided on the upper surface of the top 34 and is exposed when the frame 36 and plate 39 are swung upwardly, as by raising the finger piece 41. The chart 42 is exposed by raising the frame 36 and holding the plate 39 down, thereby raising the panel 38 off of the chart 42. In this way, the lot numbers can be conveniently put on the charts 42 and 44, and the upper chart 42 is always visible, while the chart underneath will be made visible and accessible by raising the plate 39 and frame 36 with the finger piece 41. It is also desirable to secure on the lower surface of the plate 39 a chart or table 43, such as a table of percentages, for convenient reference in figuring commissions, percentages, etc. Any suitable percentage table or chart can be used, and it need not be illustrated or described in detail as such tables are well known.

The top 34 of the cabinet is preferably provided with a depending catch 45 to engage the edge of the door 30, and hold the top 34 down on the walls of the cabinet or the door 30 up, said catch being released when the top and door are separated. A sheet 46 containing instructions as to the use of the register can be secured to the lower surface of the door 30, and is only exposed when said door is unlocked and swung upwardly. Pivoted links 47 preferably connect the top 34 and inner surface of one side wall of the cabinet, for limiting the upward movement of the tongue 34 when it is raised to obtain access to the interior of the cabinet, and said links when straightened out will support the top 34 while the cards are inserted, removed or examined.

The cabinet affords convenient and compact means for holding and inclosing the cards 2 in packs, permitting some of them to be removed and inserted without the need of a key, and preventing access to others unless the key is used, and the cabinet being provided on the top thereof with charts above the cards for convenience in locating the cards or in determining the initial letters of the various lot numbers. This register will give the user correct and complete record of all stock goods used, linked with reference data, so that the stock is compactly represented by the cards, to make it more convenient to determine the amount of stock on hand, to systematize the record of stock, and to serve as a guide for future orders.

Having thus described the invention, what is claimed as new is:—

1. A stock register embodying a cabinet having compartments, alphabetically-indexed packs of stock cards in said compartments having lot numbers and spaces for filling in data concerning the stock and disposition thereof, a top on the cabinet concealing said compartments and cards arranged to open for access to said cards, a chart on the top visible when the top is closed and having alphabetically designated columns of spaces for filling in lot numbers of the cards for alphabetical reference to the cards in said compartments, and a frame resting on the top and removable therefrom, said frame having a transparent panel over said chart.

2. A stock register embodying a cabinet having compartments, alphabetically-indexed packs of stock cards in said compartments having lot numbers and spaces for filling in data concerning the stock and disposition thereof, a top on the cabinet concealing said compartments and cards and arranged to open for access to said cards, a chart on the top visible when the top is closed and having alphabetically-designated columns of spaces for filling in lot numbers of the cards for alphabetical reference to the cards in said compartments, a door for part of said compartments carried by the cabinet under said top for preventing access to some of the cards and giving access to others, and means for locking said door to prevent unauthorized access to the cards concealed by said door.

3. A stock register embodying a cabinet having compartments, alphabetically-indexed packs of stock cards in said compartments having lot numbers and spaces for filling in data concerning the stock and disposition thereof, a top hinged to one wall of the cabinet for concealing said compartments and cards and arranged to be swung open for access to said cards, a frame hinged on said top to rest on the upper surface thereof and having a transparent panel, a plate within said frame under said panel and hinged to said frame, said plate being swingable upwardly away from the top with said frame and also being swingable away from the frame and panel, and a chart on said plate under said panel visible when the top is closed and the frame is down on said top, said chart having alphabetically-designated columns of spaces for filling in the lot numbers for alphabetical reference to the cards in said compartments.

4. A stock register embodying a cabinet having compartments, alphabetically-indexed packs of stock cards in said compartments, having lot numbers and spaces for filling in data concerning the stock and disposition thereof, a top hinged to one wall of the cabinet to seat on the cabinet and conceal said compartments and cards and arranged to swing open upwardly for access to said cards, a chart on the top visible when the top is closed and having alphabetically-designated columns of spaces for filling in the lot numbers for alphabetical reference to the cards in said compartments, a door hinged to one wall of the cabinet for covering a portion of said compartments to conceal the cards therein and prevent access thereto, said door being swingable upwardly when the top is swung upwardly, for access to such cards, and a lock for locking said door within the cabinet to prevent unauthorized access to the cards concealed by said door, and leaving the other cards accessible.

In testimony whereof I have signed my name to this specification in the presence of two subscribing witnesses.

JOSEPH H. MORIN.

Witnesses:
H. A. BURQUE,
Y. C. ROULEAU.